(12) United States Patent
Hamid

(10) Patent No.: US 9,009,816 B2
(45) Date of Patent: Apr. 14, 2015

(54) REMOVABLE MEMORY STORAGE DEVICE WITH MULTIPLE AUTHENTICATION PROCESSES

(75) Inventor: Laurence Hamid, Ottawa (CA)

(73) Assignee: Imation Corp., Oakdale, MN (US)

( * ) Notice: Subject to any disclaimer, the term of this patent is extended or adjusted under 35 U.S.C. 154(b) by 622 days.

(21) Appl. No.: 12/690,971

(22) Filed: Jan. 21, 2010

(65) Prior Publication Data

US 2010/0186084 A1 Jul. 22, 2010

Related U.S. Application Data

(60) Provisional application No. 61/146,121, filed on Jan. 21, 2009.

(51) Int. Cl.
*G06F 12/14* (2006.01)
*G06F 21/40* (2013.01)

(52) U.S. Cl.
CPC ............ *G06F 12/1458* (2013.01); *G06F 21/40* (2013.01); *G06F 2221/2105* (2013.01)
USPC .............................................. 726/19; 726/28

(58) Field of Classification Search
CPC ................ G06F 12/1458; G06F 21/40; G06F 2221/2105
USPC ............ 726/2, 22, 24, 26; 713/150, 168, 171, 713/176, 177, 189; 709/223, 227, 230, 245, 709/246; 380/28, 30, 44, 200, 255, 277
See application file for complete search history.

(56) References Cited

U.S. PATENT DOCUMENTS 5,877,483 A  3/1999 Bilich et al.
6,199,079 B1  3/2001 Gupta et al.
(Continued)

FOREIGN PATENT DOCUMENTS

GB  2397923 C  4/2005
KR  3061773 A  7/2003
WO  WO 02-093468  11/2002

OTHER PUBLICATIONS

ISA/CA, "International Search Report", dated Apr. 29, 2010, pp. 1 to 4.

(Continued)

*Primary Examiner* — Brandon Hoffman
*Assistant Examiner* — Nega Woldemariam
(74) *Attorney, Agent, or Firm* — Dorsey & Whitney LLP

(57) ABSTRACT

A method comprises providing first user authentication data of a user and comparing the first user authentication data to first stored template data. When the comparison is indicative of a match, a first session is provided, which supports one of user access for retrieving first data that are stored within a peripheral memory storage device and user access for modifying a data content of the peripheral memory storage device. The first session does not support the other one of user access for retrieving first data that are stored within the peripheral memory storage device and user access for modifying a data content of the peripheral memory storage device. During the first session, second user authentication data of the same user is provided and compared to second stored template data. When the comparison is indicative of a match, a second session is provided, which does support the other one of user access for retrieving first data that are stored within the peripheral memory storage device and user access for modifying the data content of the peripheral memory storage device.

26 Claims, 4 Drawing Sheets

(56) References Cited

U.S. PATENT DOCUMENTS

| | | |
|---|---|---|
| 6,820,148 B1 | 11/2004 | Cedar et al. |
| 7,213,266 B1 | 5/2007 | Maher et al. |
| 7,269,669 B2 | 9/2007 | Liu et al. |
| 2002/0194499 A1 | 12/2002 | Audebert et al. |
| 2004/0193925 A1 | 9/2004 | Safriel |
| 2005/0017070 A1 | 1/2005 | Miller et al. |
| 2005/0188167 A1 | 8/2005 | Squibbs et al. |
| 2005/0206353 A1 | 9/2005 | Sengoku |
| 2005/0216746 A1 | 9/2005 | Saika |
| 2006/0021041 A1* | 1/2006 | Challener et al. ............... 726/24 |
| 2006/0031289 A1 | 2/2006 | Experton |
| 2006/0161783 A1 | 7/2006 | Aiken et al. |
| 2006/0168509 A1 | 7/2006 | Boss et al. |
| 2006/0179404 A1 | 8/2006 | Yolleck et al. |
| 2006/0224847 A1 | 10/2006 | Seto et al. |
| 2007/0150953 A1 | 6/2007 | Hamid |
| 2007/0199053 A1 | 8/2007 | Sandhu et al. |
| 2008/0059742 A1 | 3/2008 | George et al. |
| 2008/0060059 A1 | 3/2008 | Yoshida |
| 2008/0114980 A1 | 5/2008 | Sridhar |
| 2009/0025091 A1 | 1/2009 | Koike et al. |
| 2009/0204240 A1 | 8/2009 | Ait Yacine |
| 2009/0248966 A1 | 10/2009 | Crandell |
| 2009/0249014 A1* | 10/2009 | Obereiner et al. ............ 711/164 |
| 2010/0125695 A1 | 5/2010 | Wu et al. |
| 2010/0146264 A1* | 6/2010 | Blume et al. .................. 713/156 |
| 2010/0153672 A1* | 6/2010 | Jogand-Coulomb et al. .. 711/164 |
| 2010/0205355 A1 | 8/2010 | Moskalik |

OTHER PUBLICATIONS

Yang, Yin. "SonD: A Fast Service Deployment System Based on IP SAN", 2008, IEEE, p. 1-10.

Fila, Jeff. "APC Biometric Password Manager Review,"*Digital Trends*, published Apr. 21, 2004, accessed Jan. 15, 2007, at <URL: http://reviews/digitaltrends.com/review1541.html>.

Kaplan, "Solutions Superguide 501 tips for better computing", 612008, PC Magazine, pg. 63-88.

\* cited by examiner

REMOVABLE MEMORY STORAGE DEVICE WITH MULTIPLE AUTHENTICATION PROCESSES

FIELD OF THE INVENTION

The instant invention relates generally to data security, and more particularly to a system and method for supporting multiple authentication processes for controllably enabling read and/or write functionality of a removable memory storage device.

BACKGROUND OF THE INVENTION

It is increasingly common to share and exchange digital data using removable memory storage devices, which are referred to typically as "memory keys," "memory sticks," "flash drives," or "thumb drives." In general, this type of storage device is a NAND-type flash memory data storage device integrated with a USB (universal serial bus) interface. USB flash drives are typically removable and rewritable, and are supported by a wide range of portable and fixed electronic devices such as laptops, personal data analysers (PDAs), personal computers, etc. They are more compact, faster, hold much more data, have a more durable design, and are more reliable for lack of moving parts than previous removable media such as floppy discs, CD-ROM, and DVD-ROM. Storage capacities currently range from 512 MB to 32 GB, with steady improvements in size and price per gigabyte. Some allow 1 million write or erase cycles, have 10-year data retention, and are connected by USB 1.1 or USB 2.0 standard interfaces. Additionally, these types of storage devices use the USB mass storage standard supported natively by modern operating systems such as Windows, Mac OS X, Linux, and other Unix-like systems. Furthermore, their portability and optional embedding of biometric sensors and/or other authentication transducers for authenticating a user, coupled with an embedded processor for executing firmware, have made USB flash drives a common storage device for storing digital data, such as for instance digital documents, forms, applications, etc.

Of course, it is common to require some form of user authentication when private or sensitive data are stored on a USB flash drive. For instance, the user is required to provide authentication data in the form of a password or a biometric input after the USB flash drive is connected to a computer system or other electronic device. Once authenticated successfully, the user is able to read and write data from and to the USB flash drive. If the user is not authenticated successfully, then user access to the data that is stored on the USB flash drive is denied. Optionally, the USB flash drive is locked or otherwise disabled subsequent to registering a predetermined number of failed authentication attempts.

Unfortunately, even when a user is authenticated successfully, there are certain risks associated with the use of a USB flash drive for sharing digital data. For instance, the user may provide authentication data in order to allow access, by another user, to the data that is stored within the USB flash drive. Typically, this situation occurs when a manager, the first user, wishes to allow an employee, the second user, to have access to the data that is stored within the USB flash drive. In this case, the second user is trusted to use the data that is stored within the USB flash drive for a specific purpose. However, the second employee may either inadvertently or with malicious intent over-write the data that is stored within the USB flash drive, or write additional data to the USB flash drive. The first user cannot prevent the unauthorized storage of data within the USB flash drive, since the first user has relinquished control of the USB flash drive to the second user subsequent to providing the necessary authentication data. Clearly, it is impractical to require the first user to constantly oversee the usage of all USB flash drives that are authenticated in this manner.

Accordingly, there is a need for a method and system that overcomes at least some of the above-mentioned limitations of the prior art.

SUMMARY OF THE INVENTION

In accordance with an aspect of the invention there is provided a method comprising: providing first user authentication data of a user; comparing the first user authentication data to first stored template data and when the comparison is indicative of a match providing a first session, the first session supporting one of user access for retrieving first data that are stored within a peripheral memory storage device and user access for modifying a data content of the peripheral memory storage device, the first session other than supporting the other one of user access for retrieving first data that are stored within the peripheral memory storage device and user access for modifying a data content of the peripheral memory storage device; during the first session, providing second user authentication data of the same user; and, comparing the second user authentication data to second stored template data and when the comparison is indicative of a match providing a second session, the second session supporting the other one of user access for retrieving first data that are stored within the peripheral memory storage device and user access for modifying the data content of the peripheral memory storage device.

In accordance with an aspect of the invention there is provided a method comprising: establishing communication between a first system and a peripheral memory storage device; performing a first authentication process for authenticating a user to the peripheral memory storage device; in response to successfully authenticating the user according to the first authentication process, providing the first system with one of read-only access to the peripheral memory storage device and write-only access to the peripheral memory storage device; performing a second authentication process for authenticating the same user to the peripheral memory storage device; and, in response to successfully authenticating the same user according to the second authentication process, providing the first system with read-and-write access to the peripheral memory storage device.

In accordance with an aspect of the invention there is provided a method comprising: establishing communication between a first system and a peripheral memory storage device; receiving first user authentication data from a user of the first system; comparing the first user authentication data to first stored template data and when a result of the comparison is indicative of a match providing a first session that supports one of read-only access to first data that are stored within the peripheral memory storage device and user access for retrievably storing second data within the peripheral memory storage device; during the first session, receiving second user authentication data from the same user; and, comparing the second user authentication data to second stored template data and when a result of the comparison is indicative of a match enabling the other one of read-only access to the first data that are stored within the peripheral memory storage device and user access for retrievably storing second data within the peripheral memory storage device.

In accordance with an aspect of the invention there is provided a peripheral memory storage device, comprising: a memory element; a communication interface coupled to the memory element; and, a processor for receiving first user authentication data and second user authentication data relating to a same user, and for enabling one of user access for retrieving data stored in the memory element and user access for writing data to the memory element, in dependence upon authenticating the user based on only the first user authentication data, and for enabling the other one of user access for retrieving data stored in the memory element and user access for writing data to the memory element, in dependence upon authenticating the user based on both of the first user authentication data and the second user authentication data.

In accordance with an aspect of the invention there is provided a computer-readable storage medium having stored thereon computer-executable instructions for implementing a method, the method comprising: establishing communication between a first system and a peripheral memory storage device; performing a first authentication process for authenticating a user to the peripheral memory storage device; in response to successfully authenticating the user according to the first authentication process, providing the first system with one of read-only access to the peripheral memory storage device and write-only access to the peripheral memory storage device; performing a second authentication process for authenticating the same user to the peripheral memory storage device; and, in response to successfully authenticating the same user according to the second authentication process, providing the first system with read and write access to the peripheral memory storage device.

BRIEF DESCRIPTION OF THE DRAWINGS

Exemplary embodiments of the invention will now be described in conjunction with the following drawings, in which.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1:
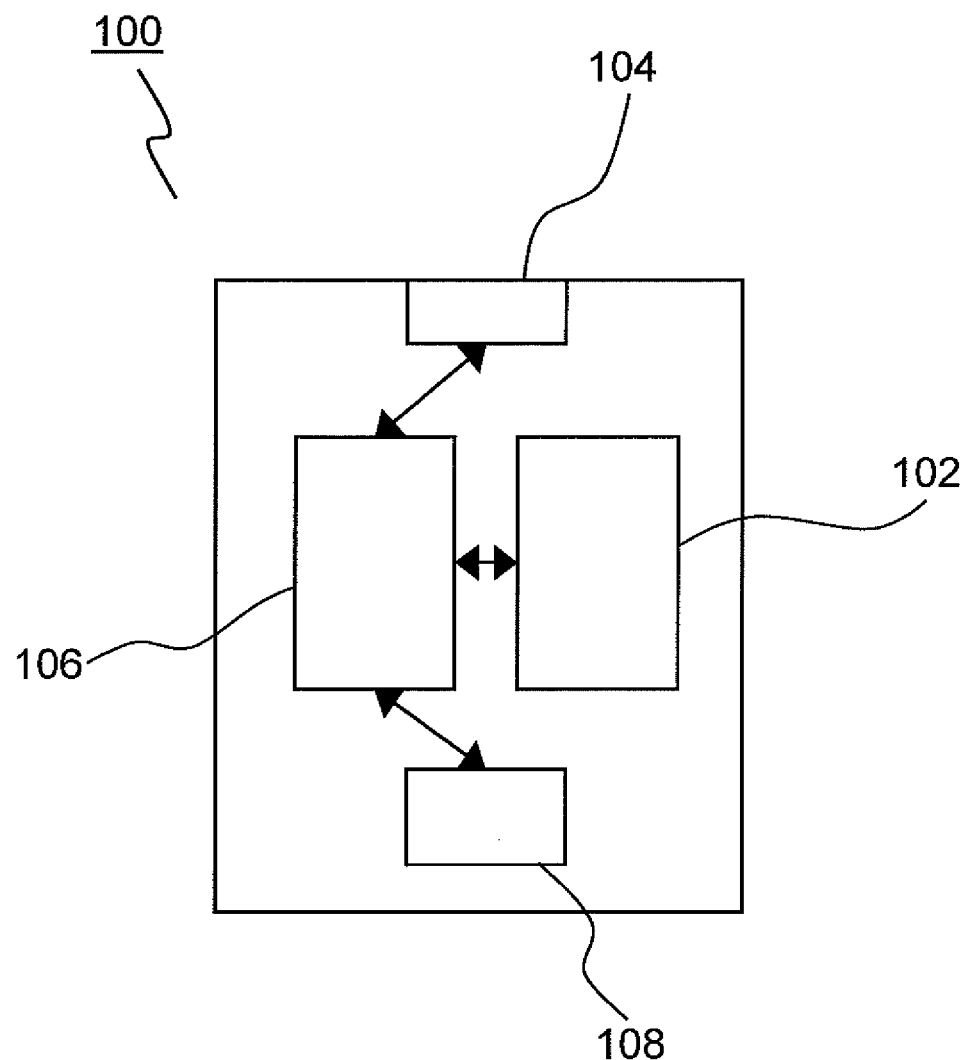
FIG. 1 shows a simplified block diagram of a removable memory storage device according to an embodiment of the instant invention.

Referring to FIG. 1, shown is a simplified block diagram of a peripheral memory storage device according to an embodiment of the instant invention. The peripheral memory storage device 100 comprises a memory element 102, a communication interface 104 coupled to the memory element 102, and a processor 106. The peripheral memory storage device 100 is housed within a suitable housing, thereby supporting portability and removability from host computer systems.

The memory element 102 comprises non-volatile memory such as for instance NAND flash memory. Alternatively, it comprises volatile random access memory (RAM) with an on-board power supply. Digital data is retrievably stored within the memory element, including digital documents, digital forms, digital media files, application data, firmware, etc. Collectively, the different forms of digital data are referred to as the data content of the peripheral memory storage device 100. User actions that write or store additional data within the memory element 102, or that erase or overwrite existing data that are stored within the memory element 102, are referred to as actions that modify the data content of the peripheral memory storage device 102.

The communication interface 104 is for supporting two-way communication between the peripheral memory storage device 100 and a first system (not shown), such as for instance one of a desktop computer, a laptop computer, a PDA, etc. By way of a specific and non-limiting example, the communication interface 104 is a universal serial bus (USB) interface. Optionally, the peripheral memory storage device 100 draws power from the first system via the communication interface 104.

The processor 106 is for receiving first user authentication data relating to a user and for receiving second user authentication data relating to the same user. Additionally, the processor 106 is for enabling user access for retrieving data that is stored in the memory element 102, in dependence upon successfully authenticating the user based only upon the first user authentication data. The processor 106 is also for enabling user access for writing data to the memory element 102 in dependence upon successfully authenticating the user based upon both of the first user authentication data and the second user authentication data. Writing data to the memory element 102 includes overwriting existing data that is stored within the peripheral memory storage device 100, updating firmware of the peripheral memory storage device 100, etc.

Optionally, the peripheral memory storage device 100 comprises an input portion 108 for receiving at least one of the first user authentication data and the second user authentication data. For instance, the input portion 108 comprises a biometric input transducer for receiving at least one of the first user authentication data and the second user authentication data in the form of biometric information. By way of a specific and non-limiting example, the biometric input transducer comprises a fingerprint reader.

During use, a user is provided with a peripheral memory storage device, upon which the user stores data. Optionally, the device contains some of application data, firmware, security data, etc. The device is set up initially with authentication data relating to the user that is associated therewith. For instance, password data for authenticating the user to the peripheral memory storage device is stored therein. Optionally, biometric information for authenticating the user to the peripheral memory storage device is stored therein, either in addition to or in place of the password data.

Communication is established between the peripheral memory storage device 100 and a first system, such as for instance by coupling the communication interface 104 to an available USB port of the first system. Once communication is established with the first system, the user is prompted to provide authentication data, such as for instance a password. The prompt optionally is in response to an attempt to read data from the peripheral memory storage device 100, or simply upon connecting the peripheral memory storage device 100 to the first system. Optionally, the user provides the authentication data without being prompted. Further optionally, the user provides the authentication data prior to establishing communication between the peripheral memory storage device 100 and the first system. In this case, the user provides authentication data via the input portion 108 of the peripheral memory storage device 100. When the user is authenticated successfully, a first session is provided for supporting user access for retrieving first data that are stored within the peripheral memory storage device 100, but other than for supporting user access for modifying the data content of the peripheral memory storage device. Accordingly, the user may read data or may set up the device to allow another user to read data, from the peripheral memory storage device 100, but no changes may be made to the data content of the peripheral memory storage device 100. Optionally, the first session is timed, expiring after a predetermined passage of time or after a predetermined number of read operations is completed. Alternatively, the first session is open ended, terminating for instance upon a user log-off, removal of the device 100 from the first system, or after a predetermined period of inactivity is detected.

In this way, the user may read data from the peripheral memory storage device 100 and be assured that data cannot be altered, either intentionally or accidentally, without additional authorization. Thus, the user when stepping away from their workstation need not be concerned that a co-worker will write data to or erase data from the peripheral memory storage device 100. Additionally, the user may retrieve files from the peripheral memory storage device 100 and modify the files, and not accidentally overwrite the original files by inadvertently selecting the "save" instead of the "save as" option.

Within the first session, the user provides additional authentication data in order to enable write/erase functionality of the peripheral memory storage device 100. For instance, after the user is authenticated successfully one time, the user is prompted to provide the additional authentication data. When the user is authenticated successfully based on the additional authentication data, a second session is provided for supporting user access for retrieving first data that are stored within the peripheral memory storage device 100, and for supporting user access for modifying the data content of the peripheral memory storage device. In this way, the user may read and write data, or may set up the device to allow another user to read and write data, from and to the peripheral memory storage device 100. Optionally, the prompt to provide the additional authentication data is provided in response to a user action requiring access to write data to or erase data from the peripheral memory storage device 100. Optionally, the user provides the additional authentication data without being prompted. Further optionally, the user provides the additional authentication data prior to establishing communication between the peripheral memory storage device 100 and the first system. In this case, the user provides the additional authentication data via the input portion 108 of the peripheral memory storage device 100. Optionally, the second session is timed, expiring after a predetermined passage of time or after a predetermined number of write/erase actions is completed. For instance, only one write/erase action is permitted without requiring re-authentication, or a plurality of write/erase actions is permitted. Alternatively, the second session is open ended, terminating for instance upon a user log-off, removal of the device 100 from the first system, or after a predetermined period of inactivity is detected.

The authentication data and the additional authentication data optionally are the same or different. For instance, one password is provided to start the first session and a different password is provided to start the second session, or one password is provided to start the first session and the same password is provided a second time to start the second session. Further optionally, a password is provided to start the first session, but biometric information is provided to start the second session. Other combinations using different types of authentication data are also envisaged.

Figure 2:
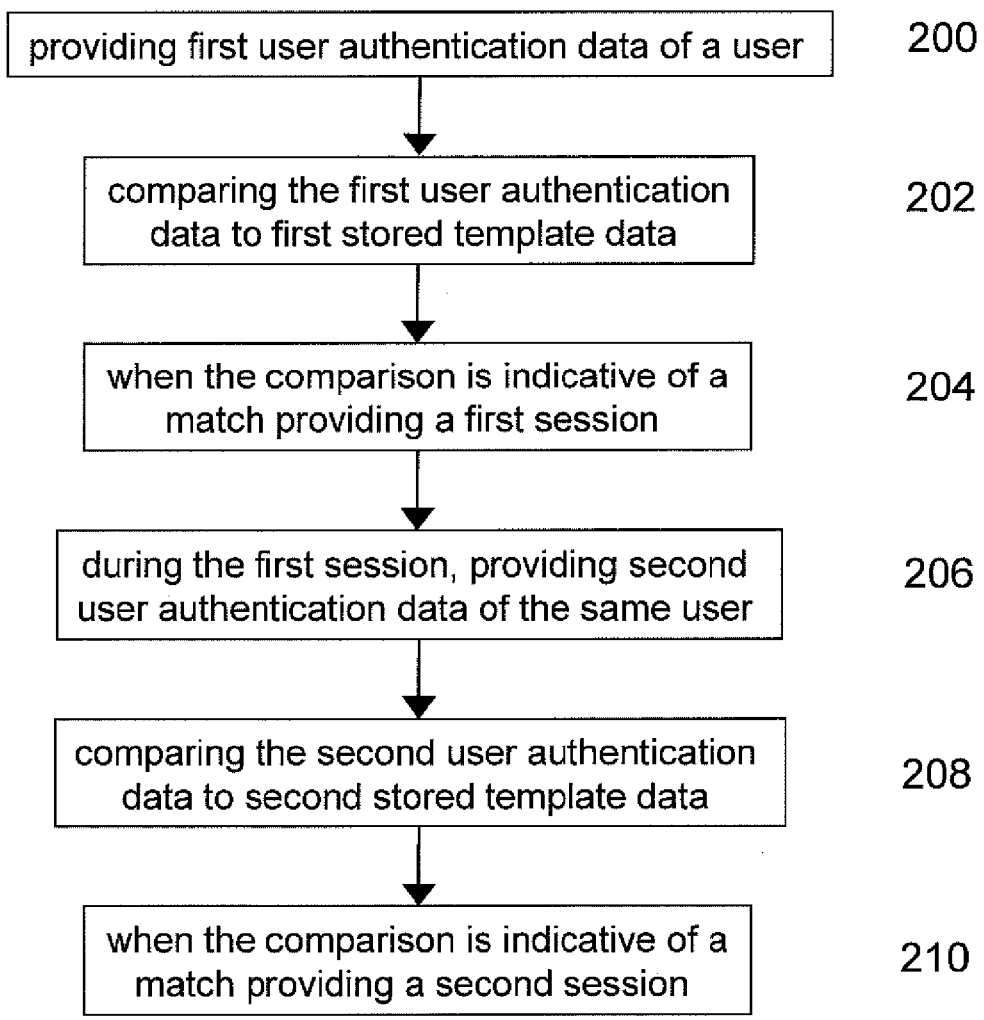
FIG. 2 shows a simplified flow diagram of a method according to an embodiment of the instant invention.

Referring now to FIG. 2, shown is a simplified flow diagram of a method according to an embodiment of the instant invention. At 200, first user authentication data of a user are provided. For instance, the first user authentication data includes one or more of a password, a biometric sample and a security token. The first user authentication data is compared to first stored template data at 202. When the comparison is indicative of a match, then a first session is provided at 204. In particular, the first session supports user access for retrieving first data that are stored within a peripheral memory storage device, but does not support user access for modifying a data content of the peripheral memory storage device. During the first session, second user authentication data of the same user are provided at 206. For instance, the second user authentication data includes one or more of a password, a biometric sample and a security token, and is optionally the same as or different than the first user authentication data. The second user authentication data is compared to second stored template data at 208. When the comparison is indicative of a match, then a second session is provided at 210. In particular, the second session supports user access for modifying the data content of the peripheral memory storage device. Optionally, the second session is timed, expiring after a predetermined passage of time or after a predetermined number of write/erase actions is completed. For instance, only one write/erase action is permitted without requiring re-authentication, or a plurality of write/erase actions is permitted. Alternatively, the second session is open ended, terminating for instance upon a user log-off, removal of the peripheral memory storage device, or after a predetermined period of inactivity is detected, etc.

Figure 3:
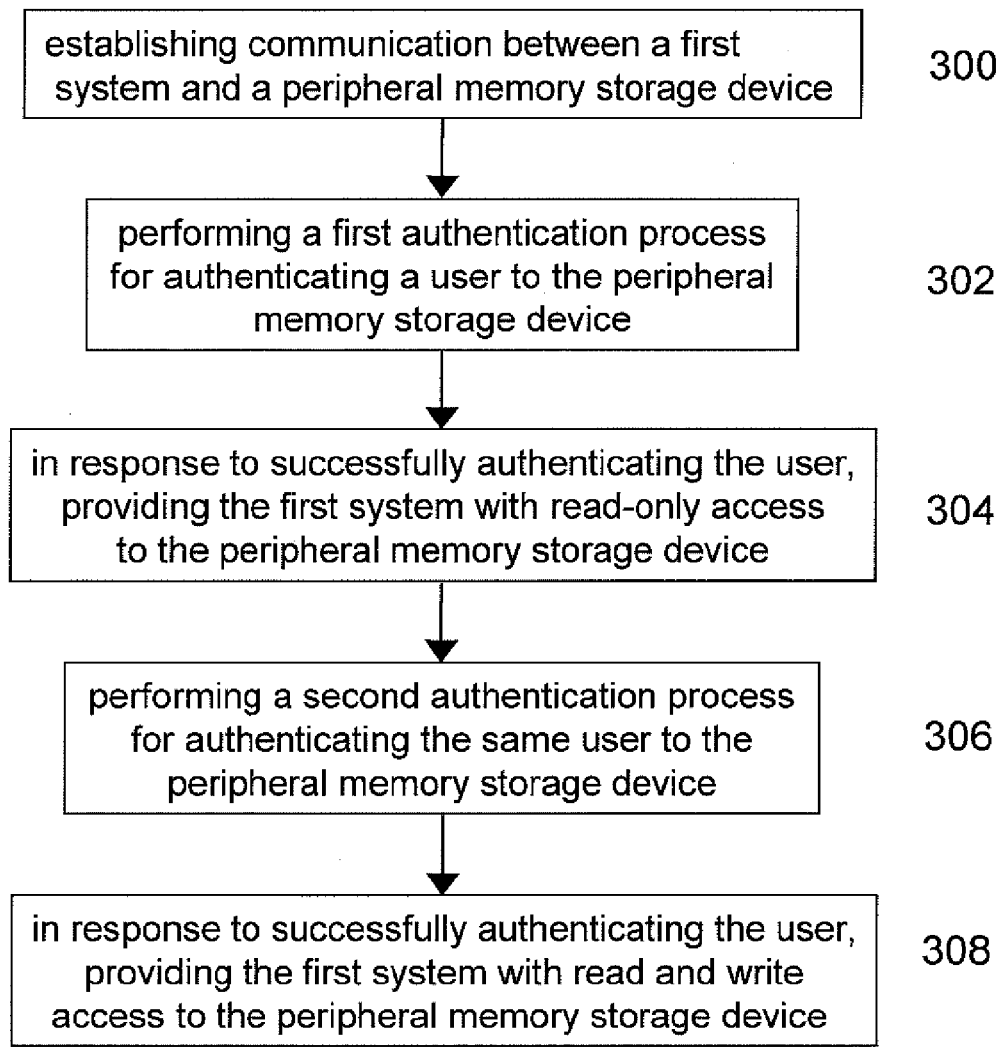
FIG. 3 shows a simplified flow diagram of a method according to an embodiment of the instant invention; and, FIG. 4 shows a simplified flow diagram of a method according to an embodiment of the instant invention.

Referring now to FIG. 3, shown is a simplified flow diagram of a method according to an embodiment of the instant invention. At 300, communication is established between a first system and a peripheral memory storage device. For instance, communication is provided via a USB interface. A first authentication process is performed at 302 for authenticating a user to the peripheral memory storage device. The first system is provided at 304 with read-only access to the peripheral memory storage device, in response to successfully authenticating the user according to the first authentication process. A second authentication process is performed at 306 for authenticating the same user to the peripheral memory storage device a second time. Thereafter, the first system is provided at 308 with both read and write access to the peripheral memory storage device, in response to successfully authenticating the same user according to the second authentication process during the first session. Optionally, the second session is timed, expiring after a predetermined passage of time or after a predetermined number of write/erase actions is completed. For instance, only one write/erase action is permitted without requiring re-authentication, or a plurality of write/erase actions is permitted. Alternatively, the second session is open ended, terminating for instance upon a user log-off, removal of the peripheral memory storage device, or after a predetermined period of inactivity is detected, etc.

Figure 4:
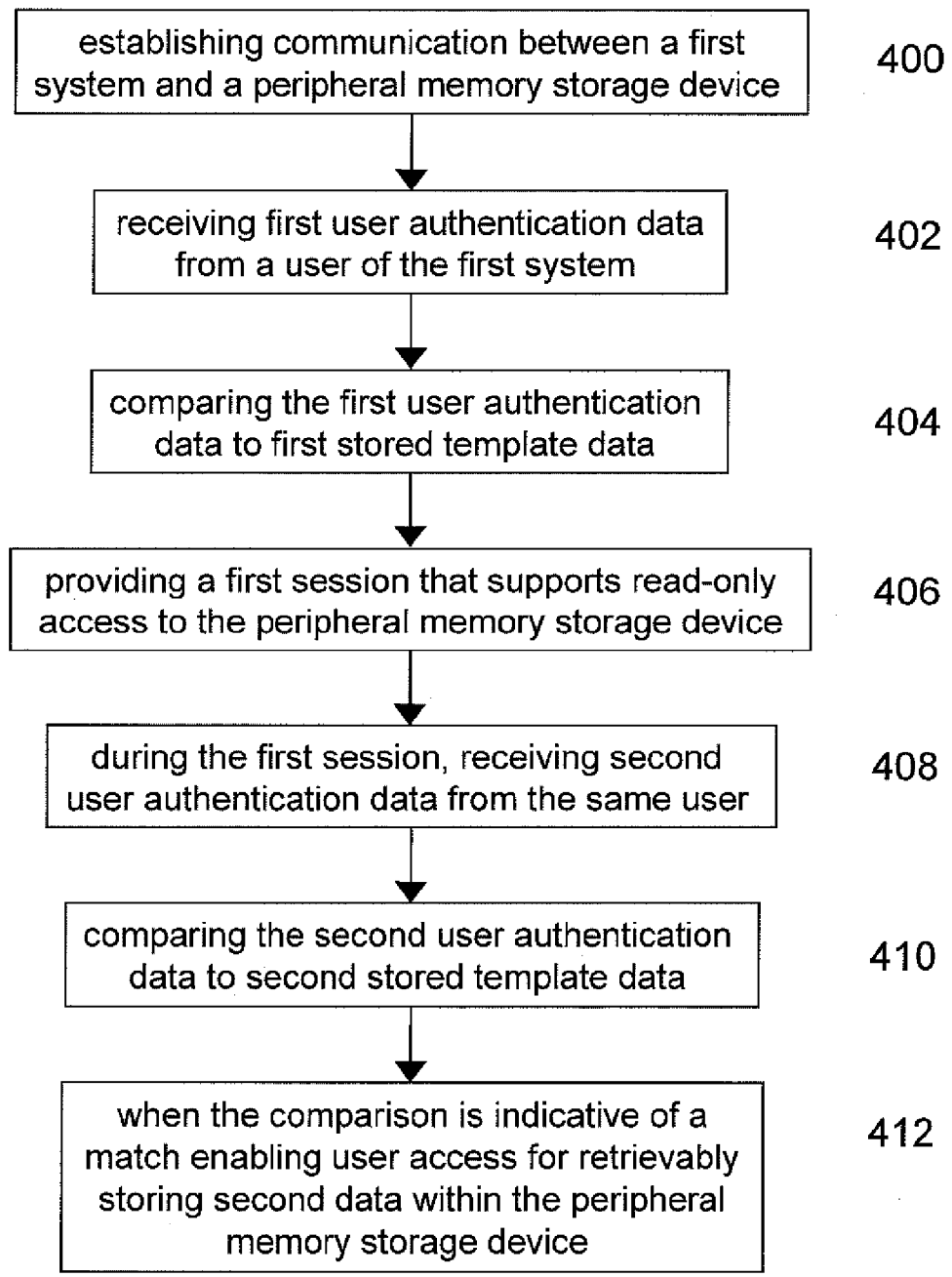

Referring now to FIG. 4, shown is a simplified flow diagram of a method according to an embodiment of the instant invention. At 400, communication is established between a first system and a peripheral memory storage device. At 402, first user authentication data is received from a user of the first system. For instance, the first user authentication data includes one or more of a password, a biometric sample and a security token. The first user authentication data is compared to first stored template data at 404. When the comparison is indicative of a match, then a first session is provided at 406. In particular, the first session supports read-only access to the peripheral memory storage device, but does not support user access for modifying a data content of the peripheral memory storage device. During the first session, second user authentication data is received from the same user at 408. For instance, the second user authentication data includes one or more of a password, a biometric sample and a security token, and is optionally the same as or different than the first user authentication data. The second user authentication data is compared to second stored template data at 410. When a result of the comparison is indicative of a match, then user access is enabled at 412 for retrievably storing second data within the peripheral memory storage device. Optionally, the second session is timed, expiring after a predetermined passage of time or after a predetermined number of write/erase actions is completed. For instance, only one write/erase action is permitted without requiring re-authentication, or a plurality of write/erase actions is permitted. Alternatively, the second session is open ended, terminating for instance upon a user log-off, removal of the peripheral memory storage device, or after a predetermined period of inactivity is detected, etc.

Though in the above described embodiments, the first session supports read operation and the second session supports write, in an alternative embodiment, the first session supports write operation and the second session supports read operations. As such, access to data within a peripheral memory storage device is limited to the second session but storing of data on the peripheral memory storage device is supported in the first session. Optionally, when storage of data is supported absent read privileges, a processor within the peripheral memory storage device ensures that existing data is not overwritten. Further optionally, when storage of data is supported absent read privileges, a processor within the peripheral memory storage device ensures that no data is overwritten providing a user with access to the second session with access to any and all data stored within the peripheral memory storage device within a first session.

Optionally, prior to providing write-access to the peripheral memory storage device, the first system with which the device is to be interfaced is scanned to detect the presence of computer viruses. The term "computer viruses" is to be broadly interpreted to include different types of malware, such as for instance true computer viruses, worms, trojan horses, rootkits, spyware, dishonest adware, crimeware and other malicious and unwanted software. If the first system is determined to be infected with any type of computer virus, then write-access to the peripheral memory storage device is denied. Conversely, write-access to the peripheral memory storage device is granted if no computer viruses are detected. Further optionally, during a session that supports either write-only access or read and write access to the peripheral memory storage device, the session is terminated upon receiving a signal indicative of the presence of a computer virus within the first system.

Numerous other embodiments may be envisaged without departing from the spirit or scope of the invention.

What is claimed is:

1. A method comprising:
receiving first user authentication data of a user for a peripheral memory storage device;
comparing the first user authentication data to first stored template data and when the comparison is indicative of a first match providing a first session, the first session supporting read-only user access for retrieving data that are stored within the peripheral memory storage device, the first session other than supporting access for modifying a data content of the peripheral memory storage device;
during the first session, receiving second user authentication data of the same user; and,
comparing the second user authentication data to second stored template data and when the comparison is indicative of a second match providing a second session, the second session supporting read-and-write user access for retrieving and storing the data within the peripheral memory storage device, for which data the first session supports read-only user access, and for modifying the data content of the peripheral memory storage device in the second session, for which data content the first session does not support modification;
wherein providing first user authentication data comprises providing biometric information, and wherein providing second user authentication data comprises providing a password.

2. The method of claim 1, further comprising establishing communication between the peripheral memory storage device and a host system.

3. The method of claim 2, wherein providing first user authentication data is performed prior to establishing communication between the peripheral memory storage device and the host system.

4. The method of claim 2, wherein communication between the peripheral memory storage device and the first system is established using a universal serial bus (USB) protocol.

5. The method of claim 1, wherein the first user authentication data and the second user authentication data are different.

6. The method of claim 1, wherein modifying the data content of the peripheral memory storage device comprises retrievably storing the data within the peripheral memory storage device.

7. The method of claim 1, wherein comparing the second user authentication data to second stored template data is performed in response to a user request to modify the data content of the peripheral memory storage device.

8. The method of claim 1, wherein the second session is of a predetermined duration of time, so as to support a predetermined number of write or erase actions for modifying the data content of the peripheral memory storage device, the second session expiring after the predetermined time or after the predetermined number of write/erase actions is completed.

9. A method comprising:
establishing communication between a host system and a peripheral memory storage device;
performing a first authentication process for authenticating a user to the peripheral memory storage device;
in response to successfully authenticating the user according to the first authentication process, wherein a first match is indicated by comparing first user authentication data of the user to first stored template data, providing a first session supporting the host system with write-only access to data stored on the peripheral memory storage device;
during the first session, performing a second authentication process for authenticating the same user to the peripheral memory storage device; and, in response to successfully authenticating the same user according to the second authentication process, wherein a second match is indicated by comparing second user authentication data of the user to second stored template data, providing a second session supporting the host system with read-and-write access to the data stored on the peripheral memory storage device, for which data the first session supports the host system with write-only access;

wherein performing the first authentication process comprises receiving first biometric information, and wherein performing the second authentication process comprises receiving password information.

10. The method of claim 9, wherein communication between the host system and the peripheral memory storage device is established using a universal serial bus (USB) protocol.

11. The method of claim 9, wherein the first authentication process and the second authentication process are different.

12. The method of claim 9, wherein the second authentication process is performed within a period of time during which the host system has the write-only access to the peripheral memory storage device.

13. The method of claim 9, wherein the second authentication process is performed in response to a user request to retrieve data from the peripheral memory storage device.

14. The method of claim 9, wherein the host system is provided with the read-and-write access to the peripheral memory storage device for a predetermined duration of time, so as to support plural user actions for writing data to the peripheral memory storage device.

15. The method of claim 9, further comprising scanning the host system for presence of a computer virus and providing the host system with the write-only access to the peripheral memory storage device only when a result of the scanning is other than indicative of the presence of a computer virus.

16. The method of claim 9, further comprising ensuring with an embedded processor of the memory storage device that existing data are not overwritten when storage of data is supported absent read privileges during the first session.

17. A removable memory storage device comprising:
an interface for establishing communication between a host system and the removable memory storage device;
an input for receiving first user authentication data from a user of the removable memory storage device;
a processor for comparing the first user authentication data to first stored template data and when a result of the comparison is indicative of a first match providing a first session that supports read-only access to data that are stored within the removable memory storage device;
during the first session, receiving second user authentication data from the same user; and,
comparing the second user authentication data to second stored template data and when a result of the comparison is indicative of a second match enabling read-and-write user access for retrievably storing the data within the removable memory storage device, for which data the first session supports read-only access;
wherein the first user authentication data comprises a fingerprint of the user; and
wherein the second user authentication data comprises a password.

18. The removable memory storage device of claim 17, wherein the processor is an embedded processor of the removable memory storage device.

19. The removable memory storage device of claim 17, wherein the interface comprises a USB interface for communication between the system and the removable memory storage device using a universal serial bus (USB) protocol.

20. The removable memory storage device of claim 17, wherein the input comprise a biometric transducer of the removable memory storage device.

21. The removable memory storage device of claim 17, wherein comparing the second user authentication data to second stored template data is performed in response to a user request to retrievably store the data within the removable memory storage device.

22. The removable memory storage device of claim 17, wherein the read-and-write user access for retrievably storing the data within the removable memory storage device is enabled for a predetermined number of user actions for retrievably storing the data on the peripheral memory storage device, the second session expiring after the predetermined number of user actions is completed.

23. A peripheral memory storage device, comprising:
a memory element for storing data;
a communication interface coupled to the memory element;
an input on the peripheral memory storage device for receiving first user authentication data and second user authentication data relating to a same user; and
a processor on the peripheral memory storage device, the processor configured for:
enabling read-only user access for retrieving the data stored in the memory element in a first session, in dependence upon authenticating the user based on a first match indicated by comparing the first user authentication data to first stored template data, and
during the first session, enabling read-and-write user access for reading and writing the data on the memory element in a second session, for which data the first session enables read-only user access, in dependence upon authenticating the user based on a second match indicated by comparing the second user authentication data to second stored template data;
wherein the input comprises a biometric transducer for receiving the first user authentication data in the form of biometric information; and
wherein the second user authentication data comprises a password.

24. The peripheral memory storage device of claim 23, wherein the communication interface comprises a universal serial bus (USB) interface.

25. A non-volatile computer-readable storage medium having stored thereon computer-executable instructions for implementing a method, the method comprising:
establishing communication between a host system and a peripheral memory storage device;
performing a first authentication process for authenticating first user authentication data of a user to the peripheral memory storage device;
in response to successfully authenticating the user according to the first authentication process, wherein a first match is indicated by comparing the first user authentication data to first stored template data, providing a first session supporting the host system with read-only access to data stored on the peripheral memory storage device;
during the first session, performing a second authentication process for authenticating second user authentication data of the same user to the peripheral memory storage device; and,
in response to successfully authenticating the same user according to the second authentication process, wherein a second match is indicated by comparing the second user authentication data to second stored template data, providing a second session supporting the host system with read-and-write access to the data stored on the peripheral memory storage device, for which data the first session supports the host system with read-only access;

wherein performing the first user authentication process comprises receiving a fingerprint of the user and performing the second user authentication process comprises receiving a password from the user.

26. The non-volatile computer-readable storage medium of claim 25, wherein performing the second user authentication process comprises performing a different user authentication process from the first user authentication process.

* * * * *